(12) United States Patent
Gribben

(10) Patent No.: US 11,947,025 B2
(45) Date of Patent: Apr. 2, 2024

(54) TRACK HIGHLY INCLINED SATELLITES WITH NOISE AFFECTED SIGNALS

(71) Applicant: Kratos Antenna Solutions Corporation, Plano, TX (US)

(72) Inventor: Douglas Gribben, Plano, TX (US)

(73) Assignee: KRATOS ANTENNA SOLUTIONS CORPORATION, Plano, TX (US)

( * ) Notice: Subject to any disclaimer, the term of this patent is extended or adjusted under 35 U.S.C. 154(b) by 0 days.

(21) Appl. No.: 18/270,916

(22) PCT Filed: Jan. 25, 2023

(86) PCT No.: PCT/US2023/011562
§ 371 (c)(1),
(2) Date: Jul. 5, 2023

(87) PCT Pub. No.: WO2023/146930
PCT Pub. Date: Aug. 3, 2023

(65) Prior Publication Data
US 2024/0045014 A1      Feb. 8, 2024

Related U.S. Application Data

(60) Provisional application No. 63/302,738, filed on Jan. 25, 2022.

(51) Int. Cl.
*G01S 3/38*        (2006.01)

(52) U.S. Cl.
CPC ..................... *G01S 3/38* (2013.01)

(58) Field of Classification Search
CPC .......... G01S 3/38; G01S 13/42; G01S 5/0294; B64G 3/00; H01Q 1/1257; H01Q 3/02; H01Q 3/04; H01Q 3/08
See application file for complete search history.

(56) References Cited

U.S. PATENT DOCUMENTS

| 5,043,737 A | * | 8/1991 | Dell-Imagine | ............ | G01S 3/42 |
| | | | | | 342/359 |
| 5,184,139 A | * | 2/1993 | Hirako | ................. | H01Q 1/1257 |
| | | | | | 244/172.6 |

(Continued)

FOREIGN PATENT DOCUMENTS

| CN | 101038169 A | * | 9/2007 |
| CN | 105005066 A | * | 10/2015 |

(Continued)

OTHER PUBLICATIONS

International Search Report and Written Opinion in related application PCT/US23/11562, dated May 10, 2023. 8 pages.

*Primary Examiner* — Dung Hong
(74) *Attorney, Agent, or Firm* — Procopio, Cory, Hargreaves & Savitch LLP

(57) ABSTRACT

A satellite tracking system and method, a three-point peaking technique is used to determine the direction of a satellite 50 which includes a signal source. A Kalman filter is used to minimize the effects of noise in the received signal during the three-point peaking operation. This determination may be made at any time. Once the position of a satellite 50 has been determined twice over a time interval, its future position may be estimated by an adaptive continuous step track technique, using a Kalman filter, which assumes that the satellite moves uniformly with time as viewed from the antenna.

15 Claims, 5 Drawing Sheets

(56) References Cited

U.S. PATENT DOCUMENTS

| | | | |
|---|---|---|---|
| 5,570,096 A * | 10/1996 | Knight | G01S 5/06 342/461 |
| 6,282,467 B1 | 8/2001 | Shah et al. | |
| 6,695,263 B1 * | 2/2004 | Goodzeit | B64G 1/361 244/164 |
| 7,256,734 B2 * | 8/2007 | Tekawy | G01S 19/02 342/357.395 |
| 8,134,512 B1 * | 3/2012 | Chen | H01Q 1/1257 342/359 |
| 11,582,623 B2 * | 2/2023 | Buer | H04W 24/02 |
| 11,804,644 B2 * | 10/2023 | Song | H01Q 1/1257 |
| 2003/0174089 A1 * | 9/2003 | Strickland | H01Q 1/1257 342/359 |
| 2015/0349417 A1 | 12/2015 | Richards et al. | |
| 2018/0115062 A1 * | 4/2018 | Cummings | H04B 7/0617 |
| 2020/0313780 A1 | 10/2020 | Park | |

FOREIGN PATENT DOCUMENTS

| | | | | |
|---|---|---|---|---|
| CN | 105628024 A | * | 6/2016 | |
| CN | 110209185 A | * | 9/2019 | |
| CN | 110793528 A | * | 2/2020 | G01C 21/04 |
| CN | 113791436 A | * | 12/2021 | |

* cited by examiner

— AZIMUTH — LEVEL ♦ MEAN LEVEL ○ AZIMUTH (PEAKING)

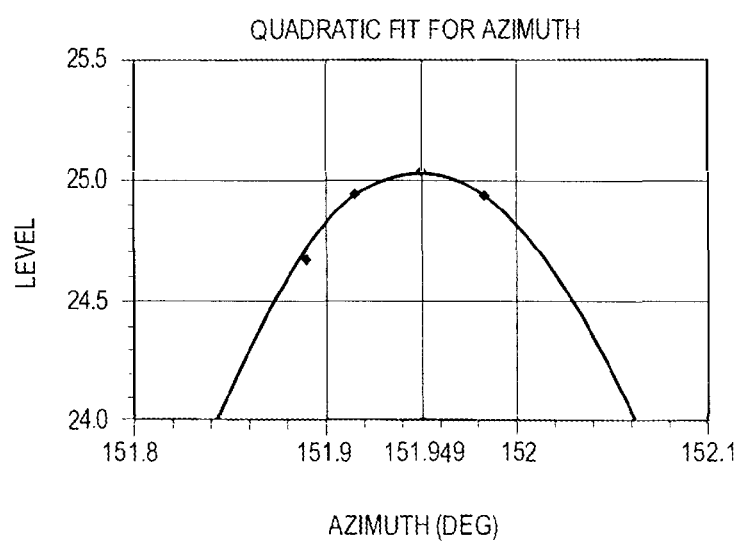
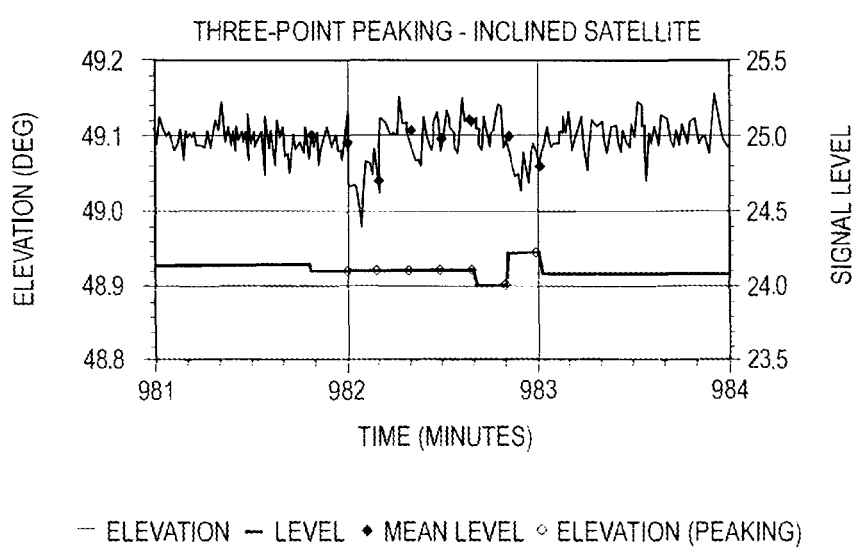

— SATELLITE ELEVATION — LEVEL — MEAN LEVEL ♦ PEAK ELEVATION

---- ANTENNA ELEVATION

TRACK HIGHLY INCLINED SATELLITES WITH NOISE AFFECTED SIGNALS

I. FIELD OF THE INVENTION

The field of the invention relates to satellites and more particularly to tracking satellites in nominally geostationary orbits about the earth. This application is related to U.S. Pat. No. 6,657,588 filed Mar. 12, 2002 which is hereby incorporated by reference in its entirety.

II. BACKGROUND OF THE INVENTION

The use of satellites for communications is well known. In principle, a satellite can be placed in a circular orbit in the equatorial plane at such a distance from the center of the earth that the orbital period is equal to the rotational period of the earth. If the direction of revolution about the earth is the same as the direction of rotation of the earth, the satellite appears to remain motionless to an observer on the earth.

In general, the orbit cannot be strictly circular and in the equatorial plane even if a satellite could be placed initially in such a perfect orbit, external forces, such as the gravity of the moon and the sun, asymmetries in the earth's gravitational field, and radiation pressures on the large photovoltaic panel arrays of the satellite, all act to gradually change the orbital elements with time. Station-keeping manoeuvres may be employed to keep the apparent position of the satellite within defined limits.

Since the satellite moves in accordance with Kepler's laws, any ellipticity of the orbit causes the satellite to move most quickly at perigee and most slowly at apogee. In general, the satellite's orbital plane may be inclined to the equatorial plane so that, even if the satellite is in a strictly circular orbit, it appears to move primarily in a north-south direction with a small east-west component as viewed from the center of the earth.

The beamwidth of the earth station antenna may be sufficiently wide that, even with the inevitable apparent motion of the satellite, the signal strength remains sufficiently constant that the earth station antenna may remain fixed.

Some applications may require an earth station antenna with greater gain. The antenna beamwidth is thereby reduced with the result that it may be necessary for the earth station antenna to track the apparent satellite motion to avoid large variations in the received signal strength. Secondly, it may become uneconomical or impossible to maintain the satellite in a geostationary orbit by station keeping maneuvers even though the satellite is otherwise operational. In this case, the satellite service lifetime may be increased by including the capability of tracking the satellite apparent motion by the earth station antenna.

For a nominally geostationary satellite, the apparent motion of the satellite is relatively slow with a periodicity of approximately one sidereal day. In general, the received signal strength may be maximized at any time by executing a series of steps in azimuth and elevation so as to 'climb' to the position of maximum received signal strength. These step tracking techniques require many back-and-forth motions of the antenna in both azimuth and elevation that may result in excessive wear of the drive system. Since the result of each measurement is generally compared only with the immediately precedent measurement, the technique is not always reliable and may fail entirely in the presence of severe atmospheric scintillations or precipitation attenuation. Recovery from these conditions generally requires human intervention.

To increase the drive system reliability and reduce routine maintenance, it is desirable to reduce the number of motion requests which are required to peak the antenna. It is also desirable to determine the satellite direction with greater precision and to reduce the susceptibility of the antenna peaking process to scintillations and other fluctuations in the receive signal level.

For higher frequencies and many locations, the antenna cannot be peaked on the satellite during periods of significant precipitation attenuation. An antenna positioning system requires a technique which maintains alignment of the antenna with the satellite when normal antenna peaking is not possible due to precipitation attenuation.

III. SUMMARY OF THE INVENTION

This disclosure provides for improved antenna positioning methods and systems. The following summary is not intended to define every aspect of the invention, and other features and advantages of the present disclosure will become apparent from the following detailed description, including the drawings. The present disclosure is intended to be related as a unified document, and it should be understood that all combinations of features described herein are contemplated, even if the combination of features are not found together in the same sentence, paragraph, or section of this disclosure. In addition, the disclosure includes, as an additional aspect, all embodiments of the invention narrower in scope in any way than the variations specifically mentioned herein.

As disclosed herein, a method of tracking a satellite signal source using an antenna includes determining the direction of the antenna to receive a maximum signal level from the satellite during a gathering stage by rotating an RF axis of the antenna within a single plane through three or more predetermined measurement angles, measuring a signal level at each angle, retaining three measured signal levels and corresponding angular positions of the predetermined measurement angles such that the measured signal level at the second angular position exceeds that of both the first and third angular positions, determining a set of coefficients of a quadratic function that relates the measured signals to the angular positions, using the coefficients of the quadratic function to determine a first angular position which maximizes a signal level from the signal source, storing the determined angular position, and repeating the preceding steps in an orthogonal plane to provide a second angular position; periodically performing the foregoing determining the direction of the antenna to receive maximum signal level process to obtain a set of first and second determined angular positions; submitting the set of angular positions to a Kalman filter to generate a filtered output; using the filtered output to estimate the position of the satellite.

The method of can further include submitting periodically determined angular positions to the Kalman filter which are above a predetermined noise threshold and further submitting the estimates of the position of the satellite to a Kalman filter to generate predicted azimuth and elevation for the antenna.

In the method the first angular position is an elevation and the second determined angular position is an azimuth. In addition, the method can include rotating the RF axis of the antenna in a single direction from a first predetermined measurement angle of the three or more predetermined measurement angles through a set of remaining signal measurement angles of the three or more measurement angles.

Additionally, The method can include determining a first signal source position at time $t_0$, a second signal source position at time $t_1$, and estimating a third signal source position at a subsequent time $t_2$ by linear extrapolation. Further, the method can include periodically estimating a further signal source position based upon previously estimated signal source positions and submitting the estimates to a Kalman filter. Further, the method can include computing later signal source positions using a set of equations that express the signal source position in geocentric spherical co-ordinates as a function of time.

As disclosed herein, an apparatus for tracking a satellite signal source using an antenna with a predetermined beamwidth includes an antenna drive adapted to rotate an RF axis of the antenna within a single plane through three or more predetermined measurement angles; a receiver which measures a signal level at each angle; and a controller configured to retain three measured signal levels and corresponding angular positions of the predetermined measurement angles such that the measured signal level at the second angular position exceeds that of both the first and third angular positions, determine a set of coefficients of a quadratic function that relates the measured signals to the angular positions, determine an angular position which maximizes a signal level from the signal source using the coefficients of the quadratic function, repeat the preceding steps in an orthogonal plane to provide a signal source position, periodically performing the foregoing determining the direction of the antenna to receive maximum signal level process to obtain a set of first and second determined angular positions, submitting the set of angular positions to a Kalman filter to generate a filtered output; using the filtered output to estimate the position of the satellite.

The controller can be further configured to periodically submit the determined angular positions to the Kalman filter which are above a predetermined noise threshold. Additionally, the controller can be further configured to submit the estimates of the position of the satellite to a Kalman filter to generate predicted azimuth and elevation for the antenna. Additionally, the first angular position is an elevation and the second determined angular position is an azimuth. Additionally, the controller can be further configured to direct the antenna to rotate the RF axis in a single direction from a first predetermined measurement angle of the three or more predetermined measurement angles through a set of remaining signal measurement angles of the three or more measurement angles. Additionally, the controller can be further configured to determine a first signal source position at time $t_0$, a second signal source position at time $t_1$, and estimating a third signal source position at a subsequent time $t_2$ by linear extrapolation. Additionally, the controller can be further configured to periodically estimate a further signal source position based upon previously estimated signal source positions and submitting the estimates to a Kalman filter.

IV. BRIEF DESCRIPTION OF THE DRAWINGS

FIG. 3 depicts results of a quadratic fit using a quadratic equation whose coefficients are provided by the system of FIG. 1 under the specific example of FIG. 2 and the peak azimuth provided by these coefficients.

FIG. 4 depicts a typical motion in elevation of an earth station antenna that may result from the three-point peaking algorithm operating within the system of FIG. 1 under the same specific example as FIG. 2.

V. DETAILED DESCRIPTION OF AN ILLUSTRATED EMBODIMENT OF THE INVENTION

This application is related to U.S. Pat. No. 6,657,588 filed Mar. 12, 2002 which is hereby incorporated by reference in its entirety.

Figure 1:
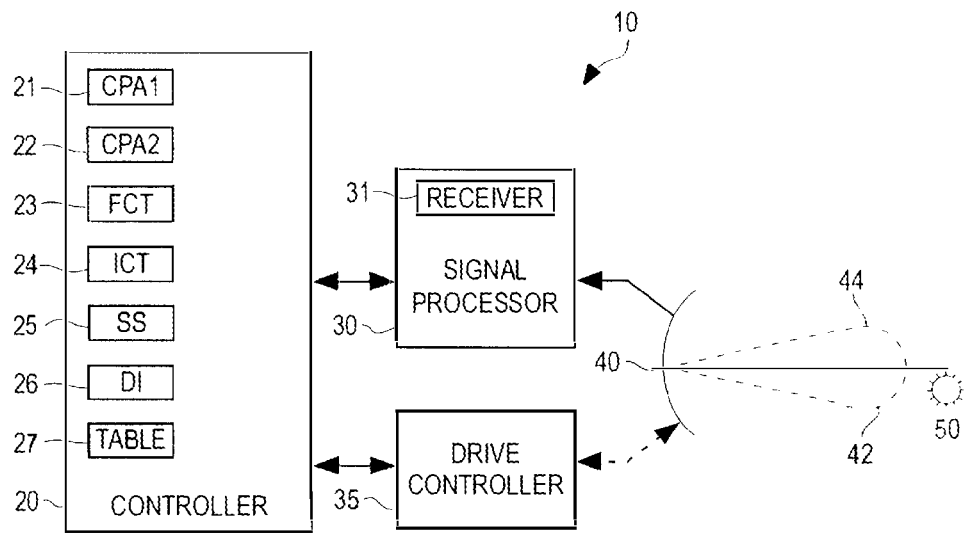
FIG. 1 depicts a system for controlling the position of an earth station antenna so as to track a nominally geostationary satellite in accordance with an illustrated embodiment of the invention.

A satellite tracking system 10, shown generally in accordance with an illustrated embodiment of the invention, may include an antenna 40, a drive controller module 35, a signal processing module (device) 30, and a controller module 20 (FIG. 1). Each of the drive controller 35, the signal processing device 30, and the controller 20 can be implemented using one or more processors having associated computer-readable data storage medium. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The antenna 40 may have an RF axis 42. If the satellite includes a signal source, the antenna may be aligned so that an outward extension of the RF axis 42 passing through the satellite 50 results in a maximum received signal strength at the antenna output. The energy received by the antenna during a suitable length of time may be measured by an appropriate receiver 31.

If the satellite includes a receiver and the terrestrial antenna transmits toward the satellite, then aligning the antenna so that an outward extension of the RF axis 42 passes through the satellite 50 results in a maximum received signal strength at the satellite. The energy received at the satellite during a suitable length of time may be measured by an appropriate receiver included within the satellite.

At an angular position θ, the reduction in antenna gain may be given by the expression $$G(\theta)=12(|\theta-\theta_0|)^2 \quad (1)$$

where $\theta_0$ is the direction of the RF axis 42 and $\theta_{BW}$ is the angle that encompasses the angular region 44 within which the gain is reduced by no more than 3 dB from that in the direction of the RF axis.

In general, antenna peaking means directing the antenna so that its RF axis is aligned with the path from the antenna to the satellite. The three-point peaking technique described below provides a unique method of aligning the RF axis of the antenna 40 with the satellite 50.

Under the illustrated embodiment, a three-point peaking technique may be used to determine the direction of a satellite 50 which includes a signal source. This determination may be made at any time.

Once the position of a satellite 50 has been determined twice over a time interval, its future position may be estimated by an adaptive continuous step track technique which assumes that the satellite moves uniformly with time as viewed from the antenna 40.

The three-point peaking technique may be used at any time to improve the alignment of the RF axis 42 of the antenna 40 with the satellite 50. Successive determinations of the position of the RF axis 42 of the antenna 40 may be tabulated as a function of time.

Since the apparent motion of the satellite 50 is periodic with time, its motion may be predicted by the orbital track technique which uses the tabulated positions of the antenna 40 to determine the coefficients of equations which describe the orbital motion of the satellite 50. The accuracy is sufficient that additional determinations of the satellite position, as may be obtained by the three-point peaking technique, are required only to enhance the accuracy of the prediction equations within the orbital track technique.

The three-point peaking technique will be described first and contrasted with the conventional step track technique.

In the conventional 'hill-climbing' step track technique, the antenna is moved in small steps in both directions along two orthogonal axes. For convenience and simplicity, the motions are typically in azimuth and elevation. At each position, the received signal level is averaged for a suitable length of time to obtained a mean level which is compared with the mean level at the previous position. If the level has decreased, the antenna is moved two increments in the opposite direction and the measurement is repeated. If the level has increased, the antenna is moved one increment in the same direction. The process is repeated until an increase in mean level is followed by a decrease in mean level with antenna motion in the same direction. The optimum position along this axis is assumed to be that which provided the maximum mean level. The entire procedure is repeated along the orthogonal axis.

In any antenna positioning system, the precision with which the RF axis of the antenna can be aligned with the path between the antenna and the satellite is limited in each of the orthogonal axes by the greater of the respective resolver resolution and the smallest increment in antenna motion that is attainable by the antenna drive system. Thus, in the conventional 'hill-climbing' step track, the position of the RF axis cannot be determined with better precision than this limitation.

The three-point peaking technique moves the antenna in each of two orthogonal axes, typically azimuth and elevation, by fixed increments which can be expressed as integer multiples of the resolver resolution. The fixed increment must equal or exceed the smallest increment in antenna motion that is attainable by the antenna drive system in the respective axis.

Under illustrated embodiments of the invention, the three-point peaking technique initially measures the mean level received by the antenna at its current position by integrating the received signal for a period of typically 10 seconds.

The controller 20 calculates an azimuth step size 25 that is typically 15% of the 3 dB full beamwidth. If the RF axis of the antenna is initially aligned with the satellite, an offset of this magnitude reduces the received signal strength by a measurable amount (0.27 dB).

The antenna 40 is commanded to move in azimuth by the step size 25 in a direction determined by the direction index 26. The mean level received by the antenna at the actual azimuth attained by the antenna is measured by integrating the received signal for a period of typically 10 seconds. The actual azimuth of the antenna is noted. If the mean level has decreased, the direction index 26 is complemented (i.e., reversed) and the antenna is commanded to move by twice the step size 25 in the opposite direction. If the mean level has increased, the antenna is commanded to move by the step size 25 in the same direction. The process is repeated until an increase in mean level is followed by a decrease in mean level. The last three actual azimuth positions bracket the antenna azimuth that maximizes the receive signal strength. In effect the movement (i.e., rotation) of the antenna 40 has caused satellite 50 to trace an arc across the RF axis 42 of the antenna 40. Only these three actual antenna positions and their corresponding levels are retained.

In accordance with equation (1), the receive signal level can be represented by the quadratic equation $L(\alpha)=c_0+c_1*\alpha+c_2*\alpha^2$, where $L(\alpha)$ is the received signal strength and $\alpha$ is the antenna azimuth or elevation. Differentiating and setting $dL(\alpha)/d\alpha=0$ defines an antenna direction of the peak signal reading in accordance with the expression $\alpha_{pk}=c_1/(2*c_2)$.

Although the actual azimuth angles which determine the quadratic equation (1) are separated by an angle approximately that of the step size 25, the peak azimuth $\alpha_{pk}$ is determined with greater precision than the resolver resolution.

The antenna 40 is then commanded to move in azimuth to the peak azimuth $\alpha_{pk}$ as calculated. The resulting actual antenna azimuth is limited by the greater of the azimuth resolver resolution and the smallest increment in antenna motion that is attainable in azimuth by the antenna drive system.

The peaking process as described for motion in azimuth is then repeated in elevation. As above and in accordance with equation (1), the receive signal level can be represented by the quadratic equation $L(\varepsilon)=c_0+c_1*\varepsilon+c_2*\varepsilon^2$ where $L(\varepsilon)$ is the received signal level, $\varepsilon$ is the actual antenna elevation, and the coefficients $c_0$, $c_1$, and $c_2$ define the quadratic equation in elevation. At the antenna elevation $\varepsilon_{pk}$ corresponding to the maximum signal strength, the slope $dL(\varepsilon)/d\varepsilon$ is zero. Thus, the elevation which provides the maximum receive signal level is $\varepsilon_{pk} = -c_1/(2 \cdot c_2)$.

The antenna is then commanded to move in elevation to the peak elevation $\varepsilon_{pk}$ as calculated. The resulting actual antenna elevation is limited by the greater of the elevation resolver resolution and the smallest increment in antenna motion that is attainable in elevation by the antenna drive system.

It is emphasized that $\alpha_{pk}$ and $\varepsilon_{pk}$ provide an estimate of the direction from the antenna 40 to the actual satellite position 50 with a precision which exceeds that attainable by the antenna due to the inherent limitations of the drive system.

The three-point peaking algorithm determines the direction $\alpha_0, \varepsilon_0$ from the antenna to the actual position of the satellite at a single time $t_0$. In general, subsequent satellite motion may cause the angle between the RF axis of the antenna and the path between the antenna and the satellite to increase.

In the illustrated embodiment, the satellite motion reduces the antenna gain by an amount $G(\theta)$ given by equation (1). It may be desirable to realign the RF axis of the antenna with the path between the antenna and the satellite using the three-point peaking technique. This may yield a second direction $\alpha_1, \varepsilon_1$ from the antenna to the actual position of the satellite at a single time $t_1$.

For complete generality, the subsequent satellite motion may be sufficiently small that the antenna gain reduction $G(\theta)$ remains acceptable. After a suitable time has elapsed, it may be desirable to realign the RF axis of the antenna with the path between the antenna and the satellite using the three-point peaking technique. This procedure may yield a second direction $(\alpha_1, \varepsilon_1$ from the antenna to the actual position of the satellite at a time $t_1$.

In the illustrated embodiment, the RF axis 42 of the antenna 40 may be realigned with the path between the antenna 40 and the satellite 50 using the three-point peaking technique whenever the mean received signal level integrated over a period of one minute is reduced by an established threshold, such as 0.3 dB, as a consequence of satellite motion, or more than an established interval, such as 3 hours, has elapsed since the previous alignment. Each alignment procedure provides an independent determination of the direction, $\alpha_i, \varepsilon_i$ from the antenna to the actual position of the satellite at the corresponding time $t_i$.

Since the satellite motion observed from the antenna has a period of one sidereal day, it will be apparent to one versed in the art that a knowledge of the antenna position ($\alpha_0, \varepsilon_0$ at time to and the antenna position $\alpha_1, \varepsilon_1$ at a subsequent time $t_1$ permits an estimation of the antenna position $\alpha, \varepsilon$ at a time t subsequent to time $t_1$.

The advantages of this adaptive continuous step track technique are described with reference to the illustrated embodiment.

The rate of change in azimuth da/dt and the rate of change of elevation d$\varepsilon$/dt are calculated from the immediately previous two antenna positions, $\alpha_0, \varepsilon_0$ and $\alpha_1, \varepsilon_1$, and their corresponding times, $t_0$ and $t_1$. The antenna position $\alpha, \varepsilon$ is calculated for a time t subsequent to $t_1$ using the computed rates of change in azimuth and elevation.

In the illustrated embodiment, the antenna is commanded to move to the calculated position $\alpha, \varepsilon$, whenever the calculated position differs from the actual antenna position by an amount which is determined by the greater of the respective resolver resolution or the smallest increment in antenna motion that is attainable by the antenna drive system.

Since the apparent motion of the satellite may be neither linear in azimuth and elevation nor uniform in these co-ordinates with time, the angle between the RF axis of the antenna as calculated by the linear extrapolation as described above and the path between the antenna and the satellite will eventually increase.

In the illustrated embodiment, satellite motion reduces the received signal level by an amount $G(\theta)$ as given by equation (1). By time $t_2$, this reduction may become greater than an established threshold, such as 0.3 dB, and the angular separation between the RF axis of the antenna and the path between the antenna and the satellite may be reduced by means of the three-point peaking technique. The new antenna position is $\alpha_2, \varepsilon_2$ at time $t_2$.

Throughout the interval from $t_1$ to $t_2$, the antenna is requested to move in azimuth and in elevation only in accordance with the linearly-extrapolated positions as calculated by the adaptive continuous step track technique. The received signal level is not reduced by more than the established threshold at any time throughout this interval.

The antenna position at any time t subsequent to $t_2$ may be calculated as a linear extrapolation of the antenna positions at times $t_1$ and $t_2$. Knowledge of the antenna position $\alpha_0, \varepsilon_0$ at time $t_0$ is not required and may be discarded.

In the illustrated embodiment, and following time $t_2$, the antenna position $\alpha_1, \varepsilon_1$ at time $t_1$ is denoted as the antenna position $\alpha_0, \varepsilon_0$ at time $t_0$. Similarly, the antenna position $\alpha_2, \varepsilon_2$ at time $t_2$ is denoted as the antenna position $\alpha_1, \varepsilon_1$ at time $t_1$.

From this description, it may be stated that the adaptive continuous step track technique approximates the actual apparent motion of a satellite 50 as viewed from the antenna 40 by a series of linear extrapolations. Each linear extrapolation is calculated from the previous two determinations of the antenna position, $\alpha, \varepsilon$ as may be obtained by the three-point peaking technique. Each linear extrapolation is a sufficiently good approximation of the actual apparent satellite path that the received level is never reduced by more than the threshold reduction due to misalignment of the antenna RF axis with the path from the antenna to the satellite.

The orbital track technique computes the antenna position $\alpha, \varepsilon$ by using simple equations which express the satellite position in geocentric spherical co-ordinates as a function of time.

The three-point peaking technique may provide a table of antenna positions, $\alpha_i, \varepsilon_i$ obtained at corresponding times $t_1$. The number of entries in the table may be substantially reduced by means of the adaptive continuous step track technique.

It is assumed that the antenna location, as may be expressed in topocentric co-ordinates such as latitude and longitude, is known with reasonable accuracy.

Assuming that the satellite is in an approximately geostationary orbit, the distance from the centre of the earth to the satellite is known with reasonable accuracy. Each antenna position, $\alpha_i, \varepsilon_i$ may be transformed by a co-ordinate transformation 23 to the geocentric spherical co-ordinate system to obtain a table 27 of $\theta_i, \varphi_i$ at corresponding times $t_i$.

It can be shown that, for practical satellites in approximately geostationary orbits, the satellite position can be described in geocentric spherical co-ordinates ($\rho, \theta, \varphi$) with considerable accuracy by three equations, as follows:

$$\rho = a^* (1 - ecc^* \cos(\kappa^* t - \omega)) \tag{2}$$

$$0 = 2^* ecc^* \sin(\kappa^* t - \omega) - 0.25^* inc^{2^*} \sin(2^* \kappa^* t) + \theta_0 \tag{3}$$

$$\varphi = inc^* \sin(\kappa^* t) + \varphi_0 \tag{4}$$

where ecc is the eccentricity, inc is the inclination (radians), a is the semi-major axis of the satellite orbit (6.61006 earth radii), $\omega$ is the argument of perigee (radians), $\kappa$ is $(2*\pi)/86164.09$, t is the time since the ascending node, $\theta_0$ is the offset in $\theta$, and $\varphi_0$ is the offset in $\varphi$. Since the time origin is not known, the time t may be rewritten as $t=t_c-t_0$, where $t_c$ is clock time and $t_0$ is the epoch which must be determined.

The orbital track technique determines the coefficients in equations (2) to (4) which best describe, in a least squares sense, the tabulated values of $\theta_i$ and $\varphi_i$ at times $t_i$. Since the periodicity of equations (2) to (4) is one sidereal day (86164.09 seconds), the coefficients cannot be determined until the table spans a sufficient fraction of one sidereal day. Without loss of generality, the illustrated embodiment assumes that the tabulated values of $\theta_i$ and $\varphi_i$ are obtained over a period of not less than six hours.

A first coefficient processing application 21 may use least squares techniques to determine the satellite inclination inc, epoch $t_0$, and offset $\varphi_0$ by fitting equation (4) to the tabulated values of $\varphi_i$ and $t_i$ that may have been obtained by application of the three-point peaking technique at arbitrary times or as directed by the adaptive continuous step track technique, both as described above.

Having determined the satellite inclination inc, epoch $t_0$, and offset $\varphi_0$, the second term in equation (3) may be calculated for each $t_i$. A second coefficient processing application 22 may then use least squares techniques to determine the satellite eccentricity ecc, argument of perigee $\omega$, and offset $\theta_0$ by fitting equation (3), modified as described above, to the tabulated values of $\varphi_i$ and $t_i$ that may have been obtained by application of the three-point peaking technique at arbitrary times or as directed by the adaptive continuous step track technique, both as described above.

After determining the four orbital parameters (inc, ecc, $\omega$, and $t_0$) and the offsets ($\theta_0,\varphi_0$), the geocentric co-ordinates of the satellite may be calculated for any clock time $t_c$. These co-ordinates may then be transformed by an inverse co-ordinate transformation 24 to the topocentric co-ordinates $\alpha,\varepsilon$ of the satellite as viewed from any terrestrial location.

In particular, this transformation from geocentric co-ordinates to the location of the antenna 40 provides the means by which the RF axis 42 of the antenna 40 remains aligned with the path from the antenna 40 to the satellite 50 as the direction to the satellite changes with time.

In general, the geocentric co-ordinates may be transformed to obtain the topocentric co-ordinates, $\alpha,\varepsilon$ for any other terrestrial location, thereby providing the means by which the RF axis of an antenna at this second location may remain aligned with the path from this second location to the satellite as the satellite appears to move with time.

Every few hours, or as otherwise desired, the alignment of the RF axis 42 of antenna 40 with the path from the antenna to the satellite 50 may be tested and possibly improved by invoking the three-point peaking technique. As described above, the antenna position ($\alpha_n,\varepsilon_n$ at this time $t_n$ is transformed to the geocentric spherical co-ordinates $\theta_n$ and $\varphi_n$ and added to the table 27 of $\theta$, $\varphi$, and t. The table size may be constrained by discarding those table elements that were acquired earlier than some chosen interval before the current time $t_n$. It is appropriate to chose the time span of the elements retained within the table 27 to be a few days.

The orbital elements of a satellite change gradually with time due to the gravitational influences of the sun and moon, the effects of radiation pressure on the solar panels of the satellite, and momentum changes imposed during station-keeping manoeuvres. The orbital elements as may be determined by the orbital tracking technique and application of the three-point peaking technique are gradually and automatically modified to accommodate these effects.

If the antenna location is known and the shaft angle resolvers have been correctly initialised, the offset $\varphi_0$ must be zero. This follows from the observation that the orbital plane of the satellite must include the centre of the earth. Although the orbital track technique can tolerate considerable initialization error in the shaft angle resolvers, a non-zero offset $\varphi_0$ provides a useful indication that the initialization of one or both shaft angle resolvers should be corrected. By definition, the offset $\theta_0$ is the satellite longitude.

Illustrated Example of the Three-Point Peaking Technique

The three-point peaking technique may be illustrated by assuming a satellite 50 with an inclination of 2.8° and moderate eccentricity of 0.00034 located at 80.900 W longitude. The antenna, with a 3 dB beamwidth of 0.22°, is located at 33° N latitude and 96.6° W longitude. The antenna 40 can be moved in both azimuth and elevation with a precision of 0.01°. The technique may be implemented, for example, by the controller 20.

Data may be provided for an illustrated example by a simulation program that includes an accurate representation of the main lobe 44 of the antenna 40. The received signal includes additive white Gaussian noise (AWGN). The receive C/N ratio of the simulation is lower than that normally expected with a typical satellite beacon 50 and antenna 40.

Figure 2:
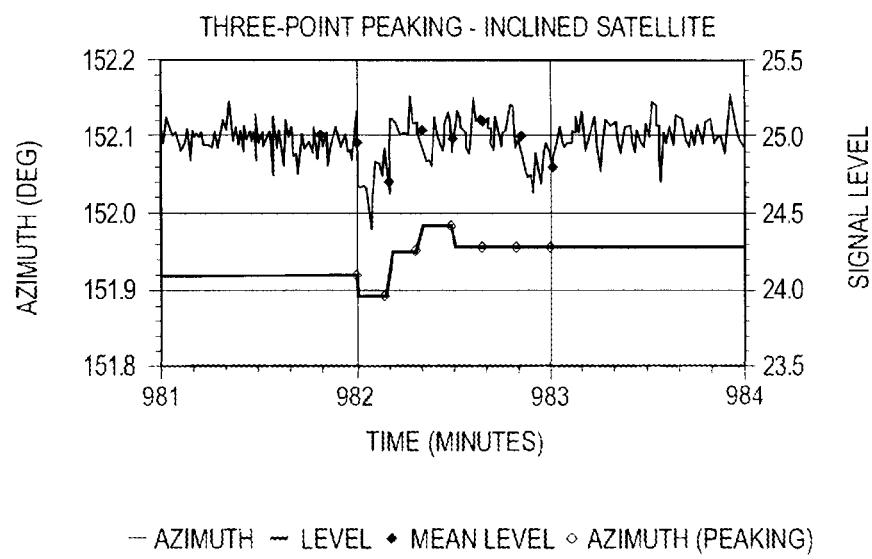
FIG. 2 depicts a typical motion in azimuth of an earth station antenna resulting from the three-point peaking algorithm operating within the system of FIG. 1 under a specific example.

The received signal strength is plotted as the upper trace (FIGS. 2 and 4). The three-point peaking algorithm begins at 981 m 50 s (initial solid diamond, FIG. 2). The received signal level is measured for the next ten seconds. The mean received signal level for the current azimuth of 152.92° is available at 982 m 00 s. As required by the three-point peaking technique, the azimuth is reduced by the azimuth step size to 151.89°. The received signal level is measured for a further ten seconds. The mean received signal level for the new azimuth is available at 982 m 10 s. Since the second mean signal level is less than the first, the antenna azimuth is increased by twice the azimuth step size to 151.95°. The mean received signal level for this azimuth is available at 982 m 20 s. Since the mean level has increased, the azimuth is again increased by the azimuth step size to 151.98°. The mean received signal level for this azimuth is available at 982 m 30 s. Since the mean level has decreased, there are two ten-second means, the first and the fourth, which bracket the third mean. The second ten-second mean and its corresponding azimuth are ignored.

The coefficients of a quadratic equation in azimuth which includes all three retained means are calculated. The locus of points defined by this quadratic equation may be depicted by the solid curve (FIG. 3). All four ten-second means are plotted as solid diamonds. From the equation of the quadratic curve, the peak azimuth $\alpha_{pk}$ is calculated to be 151.949°.

Figure 5:
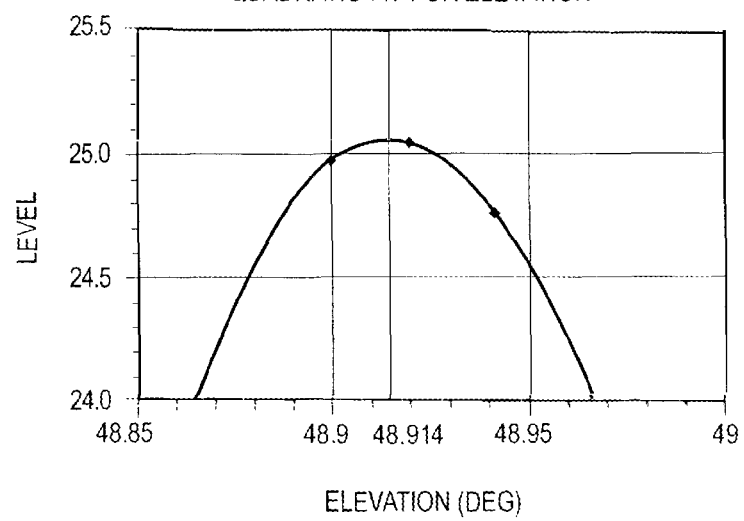
FIG. 5 depicts results of a quadratic fit using a quadratic equation whose coefficients are provided by the system of FIG. 1 under the specific example of FIG. 4 and the peak elevation provided by these coefficients.

The antenna 40 is then moved to an azimuth of 151.95°, which positions the antenna as close to the calculated peak azimuth $\alpha_{pk}$ as possible. The peaking process is repeated in elevation (FIG. 4). Only three ten-second means are required to bracket the peak elevation. The coefficients of a quadratic equation in elevation which includes all three means are calculated. The locus of points defined by this quadratic equation may be depicted by the solid curve (FIG. 5). From the equation of the quadratic curve, the peak elevation $\varepsilon_{pk}$ is calculated to be 48.914°. The antenna 40 is then moved to an elevation of 48.91°, which positions the antenna as close to the calculated peak elevation $\varepsilon_{pk}$ as possible. The entire peaking process has taken 70 s.

For this specific example, the three-point peaking algorithm has determined the azimuth and elevation of the RF axis 42 to be 151.949° and 48.914° respectively. The antenna 40 is moved with the maximum possible precision to an azimuth and elevation of 151.95° and 48.910 respectively. Illustrated example of the adaptive continuous step track technique The adaptive continuous step track technique may be illustrated by assuming a satellite 50 with an inclination of 2.8° and moderate eccentricity of 0.00034 located at 80.9° W longitude. The antenna, with a 3 dB beamwidth of 0.22°, is located at 330 N latitude and 96.6° W longitude. The antenna 40 can be moved in both azimuth and elevation with a precision of 0.01°.

Data may be provided for an illustrated example by a simulation program that includes an accurate representation of the main lobe 44 of the antenna 40. The received signal includes additive white Gaussian noise (AWGN). The receive C/N ratio of the simulation is lower that normally expected with a typical satellite beacon 50 and antenna 40.

Figure 6:
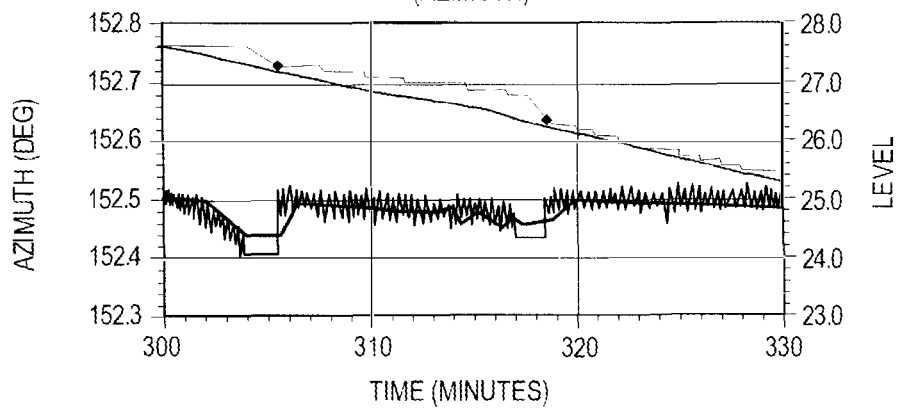
FIG. 6 depicts the typical motion in azimuth of an earth station antenna using an adaptive continuous step track technique within the system of FIG. 1 under another specific example.
Figure 7:
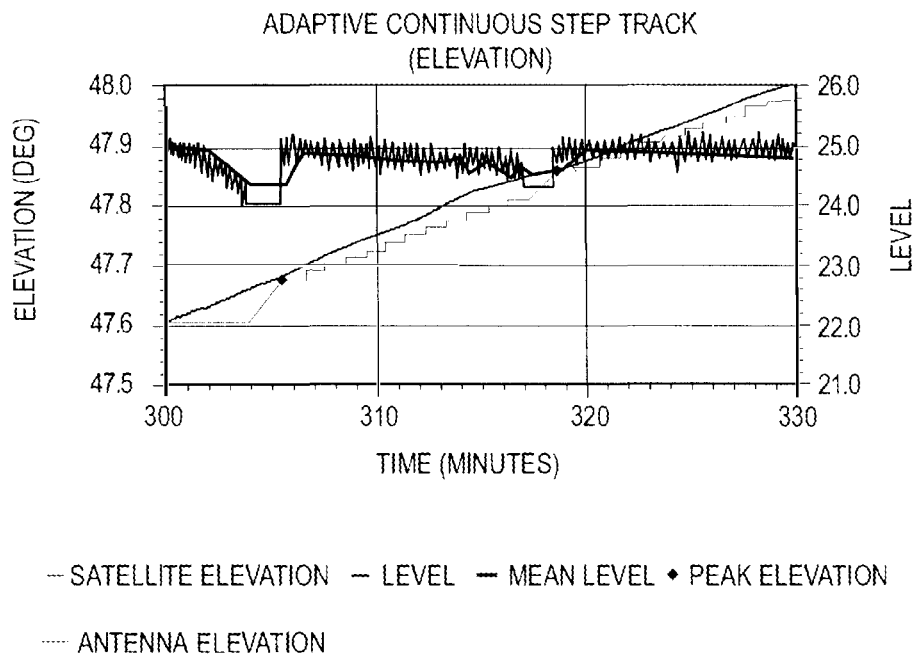
FIG. 7 depicts the typical motion in elevation of an earth station antenna using the adaptive continuous step track technique within the system of FIG. 1 under the same specific example as FIG. 6.
Figure 8:
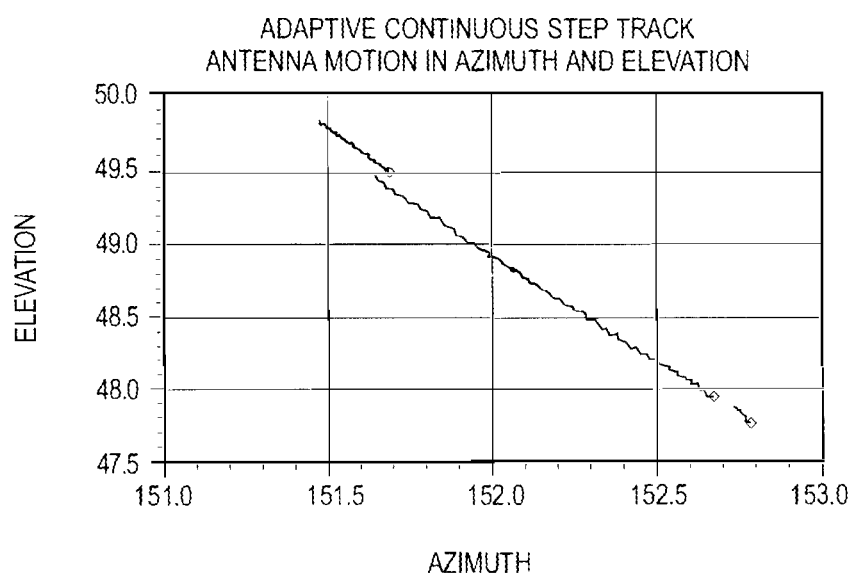
FIG. 8 depicts the linearly-extrapolated motion in azimuth and elevation of an earth station antenna using the adaptive continuous step track technique within the system of FIG. 1 under the same specific example as FIGS. 6 and 7.

The adaptive continuous step track technique is illustrated by plotting the received signal strength (light grey line), the one-minute mean received signal strength (heavy line), the satellite azimuth and elevation (continuous thin line), and antenna azimuth and elevation (staircase line) with time (FIGS. 6 and 7). The antenna is peaked in azimuth and elevation as indicated by the solid diamonds. The antenna motion as extrapolated according to the Adaptive Continuous Step Track technique is shown as a sequence of linear movements (FIG. 8). The antenna position immediately following each three-point peaking is indicated by the solid diamonds.

In the example, the antenna RF axis is initially aligned with the path from the antenna 40 to the satellite 50 with a precision which is limited by the controller resolution (0.01°). For purposes of illustration only, the initialization occurs at an arbitrary time of 300 minutes.

Since only one determination of the direction to the satellite 50 has been made, any subsequent motion of satellite which may occur is not known. Accordingly, the antenna 40 remains stationary in azimuth and elevation.

In this illustrative example, the satellite 50 is moving sufficiently rapidly that the one-minute mean received signal level drops by 0.6 dB within a few minutes. An application of the three-point peaking technique aligns the RF axis 42 of the antenna 40 with the satellite 50 within the precision possible with the controller 35. The receive level and antenna position are not shown during application of the three-point peaking technique.

On completion of the second peaking, the antenna position is known at two times separated, in this illustrative example, by approximately six minutes. The slopes da/dt and dF/dt are computed. Every minute thereafter, the extrapolated azimuth and elevation are calculated and the antenna 40 is moved to this position within the precision possible with the controller 35 (staircase line, FIGS. 6 and 7).

Since the apparent motion of the satellite 50 is neither linear in azimuth and elevation nor uniform in these co-ordinates with time, the angular separation between the RF axis 42 and the path from the antenna 40 to the satellite 50 will increase. In this illustrative example, the one-minute mean receive level drops by 0.6 dB at the time denoted by approximately 318 minutes, approximately 13 minutes after the previous peaking. The three-point peaking technique is applied to re-align the RF axis 42 with the path between the antenna 40 and the satellite 50 within the precision that is possible with the controller 35.

In the same manner as before, the slopes da/dt and dF/dt are computed from the antenna peakings that occurred at approximately 305 minutes and 318 minutes. Previous values of peak azimuth and elevation are discarded. Every minute thereafter, the extrapolated azimuth and elevation are calculated and the antenna 40 is moved to this position within the precision possible with the controller 35 (staircase line, FIGS. 6 and 7).

Since the time increment is greater (13 minutes), it is expected that the slopes da/dt and dp/dt are known with greater accuracy. As a result, the calculated antenna position may remain adequately aligned with the satellite for a longer time. In this illustrated example, the antenna does not require peaking again until more than two hours has elapsed.

The period between successive peakings of the antenna in azimuth and elevation decrease as the rate-of-change of the apparent satellite azimuth and elevation diminish and reverse sign. The simulations show that the adaptive continuous step track technique continues to approximate the satellite motion by a series of linear extrapolations.

When the signal is affected to a great extent (and azimuth and elevation typically to a lesser one) by noise, primarily atmospheric path loss variations in the short and long term, this noise can strongly degrade the quality of the estimated orbit, requiring far more samples to attempt to stay within acceptable error bounds. A functional improvement can be obtained by submitting the sequence of estimated peaks (a set pf determined angular positions) from the three-point peaking technique into Kalman filters (e.g., of the Benedict-Bordner type) for each axis (azimuth, elevation) to produce a better estimate of the true position of the satellite in the presence of noise. During the gathering stage, the resulting estimated peaks (a set of are fed into the filter. The output of the filter is used instead of the linear extrapolation to project time movement, giving a more faithful pointing angle in the gathering stage. The output of the filter(s) is also fed to the orbital estimation algorithm, giving a better input set and a more accurate ephemeris output. Once the system transitions to the predictive mode, the output azimuth and elevation from the propagated predictions are submitted to the Kalman filters to keep them synchronized to the current trajectory of the target.

Additionally, because severe rain fain and other anomalies can disturb the quality of the results, only estimated peaks with actual measured signals above a predetermined noise threshold (e.g., within 2 dB of the clear sky level) are submitted to the Kalman filters. This prevents noise caused by atmospheric losses from corrupting the input data. The output of the filter is used instead of the measured peak to attempt to follow the satellite more closely.

The result of this is a more accurate tracking approach with more robust rejection of rain-fade noise, which is significant for geosynchronous satellites with sufficient inclination to move out of the current look angle within the time of a rain or other atmospheric event.

Illustrated Example of the Orbital Track Technique

The orbital track technique may be illustrated by assuming a satellite 50 with an inclination of 3.0° and moderate eccentricity of 0.00040. The antenna, with a 3 dB beamwidth of 0.22°, is located at 330 N latitude and 96.6° W longitude. The antenna 40 can be moved in both azimuth and elevation with a precision of 0.01°.

Data may be provided for an illustrated example by a simulation program that includes an accurate representation of the main lobe 44 of the antenna 40. The received signal includes additive white Gaussian noise (AWGN).

Figure 9:
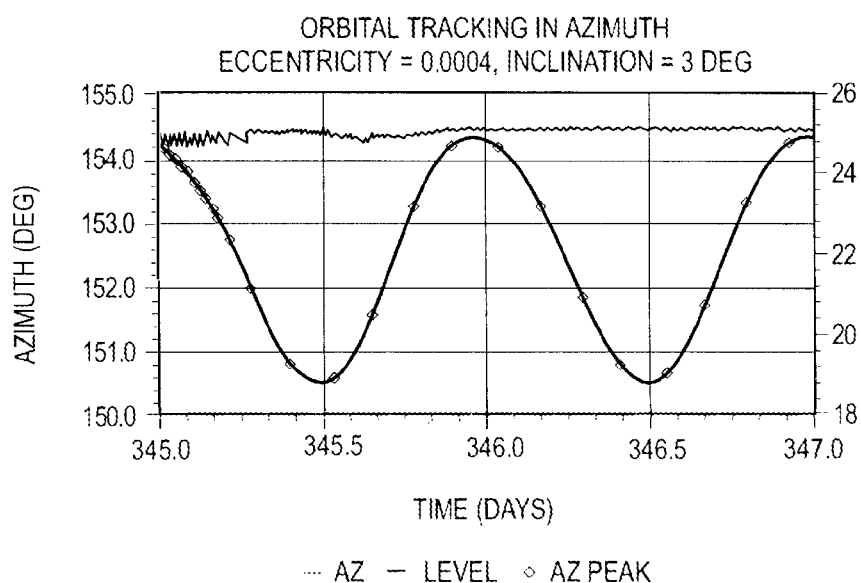
FIG. 9 depicts the orbital track motion in azimuth using the orbital track technique within the system of FIG. 1 under another specific example.
Figure 10:
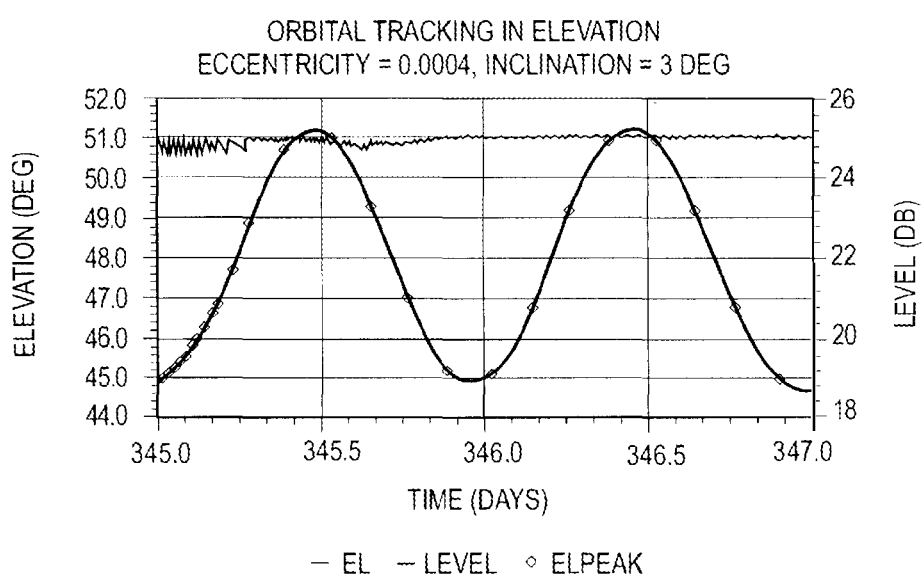
FIG. 10 depicts the orbital track motion in elevation using the orbital track technique within the system of FIG. 1 under the same specific example as FIG. 9.

The orbital track technique may be illustrated by plotting the received signal strength (FIGS. 9 and 10) with the antenna azimuth as a function of time (FIG. 9) and with the antenna elevation as a function of time (FIG. 10).

In this illustrative example, the RF axis 42 is initially aligned with the path from the antenna 40 to the satellite 50) using the three-point peaking technique. For purposes of illustration only, the initialization occurs at an arbitrary time of 345.0 days.

After a few minutes, the one-minute mean receive level has dropped sufficiently that the antenna RF axis must be realigned with the path to the satellite. On completion of this second peaking, the antenna position is known at two times and, in accordance with the adaptive continuous step track technique, the slopes in azimuth da/dt and in elevation dF/dt are computed. Every minute, the extrapolated azimuth and elevation are calculated and the antenna is moved to this position as determined by the precision of the drive control system 35.

From time to time, the mean receive level may drop sufficiently that the adaptive continuous step track technique requests that the antenna RF axis be re-aligned with the path to the satellite by means of the three-point peaking technique.

Since the antenna location and orientation of the topocentric co-ordinate system are both known, each pair of values of antenna azimuth and elevation obtained from each three-point peaking are transformed to θ and φ in the geocentric spherical co-ordinate system as required by the orbital track technique, a table is formed by storing the values of θ, φ, and time.

The antenna position is determined by the adaptive continuous step track technique until at least six pairs of θ and φ which span at least six hours (0.15 day) have been entered into the table.

In this illustrative example, the satellite apparent motion and the antenna beamwidth are such that more than six pairs of θ and φ are obtained within the first six hours (0.15 day). All subsequent antenna positions are determined by the orbital track technique.

In this illustrative example, the orbital track technique aligns the antenna RF axis 42 with the path from the antenna to the satellite every three hours (0.125 day). The calculated values of θ and φ are added to the table and used to refine the estimated orbital parameters. The time of each antenna peaking and the resulting peak azimuth and elevation are indicated by open diamonds (FIGS. 9 and 10).

It is evident in this illustrative example that the orbital elements determined during the first twelve hours (0.5 days) result in a gradually increasing mis-alignment of the RF axis with the path from the antenna to the satellite. The three-point peaking approximately 16 hours from the start of the simulation (345.65 days) refines the orbital elements so that the RF-axis remains well-aligned with the path from the antenna to the satellite for the remainder of the two-day simulation.

Advantages Over the Prior Art

The system 10 described above offers a number of advantages over the prior art. Fewer antenna motion commands are required to peak the antenna 40 using the three-point peaking technique than with conventional step tracking. Since the technique does not rely on the very small differences in receive signal strength which result from small motions close to the peak of the antenna pattern, it is inherently robust in the presence of signal fluctuations due to atmospheric scintillation and precipitation.

The antenna 40 is stepped from one side of the peak to the other so that all measurements are obtained, in most cases, with the drive system 35 moving in one direction only. Since the loading on the drive system 35 is usually in the same direction while obtaining all data points, backlash is eliminated during the three-point peaking process. Similarly, errors in the shaft angle resolver output which result in torsions in the coupling to the resolver and loading from the shaft angle resolver bearings are always included with the same sign in the computed peak position.

Further, the three-point peaking technique determines the direction of the RF axis 42 with a precision which is greater than that attainable from either the shaft angle resolver resolution or the smallest increment in antenna motion that is possible with the antenna drive system 35.

In general, the antenna is peaked regardless of the antenna location, any errors, including large errors, in the shaft angle resolver initialization, and any non-linearities in the shaft angle resolver output provided that the output is a single-valued function of position over the relevant fraction of the antenna 3 dB beamwidth.

The adaptive continuous step track technique has several advantages over prior methods. The adaptive continuous step track technique significantly reduces the number of alignments of the RF axis 42 with the path between the antenna 40 and the satellite 50 that are required to maintain an adequate receive signal level. It is particularly effective with large antennas which track satellites with significant inclination or eccentricity.

The satellite motions in azimuth and elevation are most linear with time when the satellite appears to move the most quickly. Under prior art methods, the antenna would have to be frequently repeaked during these periods. The adaptive continuous step track technique eliminates most of this peaking activity and the antenna moves in azimuth and elevation with the precision of the antenna drive system 35.

Since the direction of motion in azimuth and elevation each reverses only twice each day, it follows that, except for peaking the antenna, most antenna motion requests are in the same direction as the previous request. This greatly reduces stress and wear on the antenna drive and positioning system. In general, the adaptive continuous step track technique is effective regardless of antenna location, any errors, including large errors, in the shaft angle resolver initialization, and any non-linearities in the shaft angle resolver output provided that the output is a single-valued function of position over the range of satellite motion in azimuth and elevation.

In addition to the benefits provided by the three-point peaking technique and the adaptive continuous step track technique, the orbital track technique further improves tracking accuracy and reduces the number of alignments of the RF axis with the satellite path that are required to maintain an adequate receive signal level. If necessary, re-peaking the antenna can be abandoned during periods of precipitation attenuation or excessive atmospheric scintillation activity.

The orbital tracking technique calculates the relevant orbital elements of the satellite and moves the antenna in accordance with Kepler's laws. The orbital tracking technique automatically revises the satellite's orbital elements to include the effects of orbital alterations resulting from various forces, such as solar and lunar gravitation, and satellite station keeping activities.

Further, the offset term φhd 0 provided by the orbital track technique indicates the accuracy with which the shaft angle resolvers have been initialized. The offset term $\theta_0$ provided by the orbital track technique is equivalent to the satellite longitude.

Using the orbital track technique, the antenna moves so as to remain aligned with the satellite for many days without repeaking the antenna. The orbital track technique also provides the ability to transfer tracking data from the antenna location to any other location on the earth. The orbital track technique is effective regardless of moderate errors in the shaft angle resolver initialization, and non-linearities in the shaft angle resolver resolution provided that the output is a single-valued function of position over the range of satellite motion in azimuth and in elevation and that the error does not unduly distort the satellite path as viewed from the antenna.

The various illustrative processes, methods, modules and algorithm steps described in connection with the embodiments disclosed herein may be implemented as electronic hardware, computer software, or combinations of both. Any features and functions described as modules or components may be implemented together in an integrated logic device or separately as discrete but interoperable logic devices (e.g., processors). To clearly illustrate this interchangeability of hardware and software, various illustrative processes, methods and algorithm steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

If implemented in software, the techniques may be realized at least in part by a computer-readable data storage medium comprising program code including instructions that, when executed, performs one or more of the methods described above. The computer-readable data storage medium may be nontransitory and form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Specific embodiments of a method and apparatus for tracking a satellite have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of tracking a satellite signal source using an antenna, such method comprising:
   determining the direction of the antenna to receive a maximum signal level from the satellite during a gathering stage by
      rotating an RF axis of the antenna within a single plane through three or more predetermined measurement angles,
      measuring a signal level at each angle,
      retaining three measured signal levels and corresponding angular positions of the predetermined measurement angles such that the measured signal level at the second angular position exceeds that of both the first and third angular positions,
      determining a set of coefficients of a quadratic function that relates the measured signals to the angular positions,
      using the coefficients of the quadratic function to determine a first angular position which maximizes a signal level from the signal source,
      storing the determined angular position,
      and
      repeating the preceding steps in an orthogonal plane to provide a second angular position;
   periodically performing the foregoing determining the direction of the antenna to receive maximum signal level process to obtain a set of first and second determined angular positions;
   submitting the set of angular positions to a Kalman filter to generate a filtered output;
   using the filtered output to estimate the position of the satellite.

2. The method of claim 1 further comprising submitting periodically determined angular positions to the Kalman filter which are above a predetermined noise threshold.

3. The method of claim 2 further comprising submitting the estimates of the position of the satellite to a Kalman filter to generate predicted azimuth and elevation for the antenna.

4. The method of claim 1 wherein the first angular position is an elevation and the second determined angular position is an azimuth.

5. The method of claim 1 further comprising rotating the RF axis of the antenna in a single direction from a first predetermined measurement angle of the three or more predetermined measurement angles through a set of remaining signal measurement angles of the three or more measurement angles.

6. The method of claim 5 further comprising determining a first signal source position at time $t_0$, a second signal source position at time $t_1$, and estimating a third signal source position at a subsequent time $t_2$ by linear extrapolation.

7. The method of claim 6 further comprising periodically estimating a further signal source position based upon previously estimated signal source positions and submitting the estimates to a Kalman filter.

8. The method of claim 1 further comprising computing later signal source positions using a set of equations that express the signal source position in geocentric spherical co-ordinates as a function of time.

9. An apparatus for tracking a satellite signal source using an antenna with a predetermined beamwidth, the apparatus comprising:

an antenna drive adapted to rotate an RF axis of the antenna within a single plane through three or more predetermined measurement angles;

a receiver which measures a signal level at each angle; and a controller configured to retain three measured signal levels and corresponding angular positions of the predetermined measurement angles such that the measured signal level at the second angular position exceeds that of both the first and third angular positions, determine a set of coefficients of a quadratic function that relates the measured signals to the angular positions, determine an angular position which maximizes a signal level from the signal source using the coefficients of the quadratic function, repeat the preceding steps in an orthogonal plane to provide a signal source position, periodically performing the foregoing determining the direction of the antenna to receive maximum signal level process to obtain a set of first and second determined angular positions, submitting the set of angular positions to a Kalman filter to generate a filtered output;

using the filtered output to estimate the position of the satellite.

10. The apparatus of claim 9 wherein the controller is further configured to periodically submit the determined angular positions to the Kalman filter which are above a predetermined noise threshold.

11. The apparatus of claim 9 wherein the controller is further configured to submit the estimates of the position of the satellite to a Kalman filter to generate predicted azimuth and elevation for the antenna.

12. The apparatus of claim 9 wherein the first angular position is an elevation and the second determined angular position is an azimuth.

13. The apparatus of claim 9 wherein the controller is further configured to direct the antenna to rotate the RF axis in a single direction from a first predetermined measurement angle of the three or more predetermined measurement angles through a set of remaining signal measurement angles of the three or more measurement angles.

14. The apparatus of claim 13 wherein the controller is further configured to determine a first signal source position at time $t_0$, a second signal source position at time $t_1$, and estimating a third signal source position at a subsequent time $t_2$ by linear extrapolation.

15. The apparatus of claim 14 wherein the controller is further configured to periodically estimate a further signal source position based upon previously estimated signal source positions and submitting the estimates to a Kalman filter.

\* \* \* \* \*